3,307,331
LIQUID FLOW CONTROL METHOD
AND APPARATUS
Robert D. Lambert, Fort Wayne, Ind., assignor to Symington Wayne Corporation, Salisbury, Md., a corporation of Maryland
Filed Apr. 23, 1964, Ser. No. 362,091
17 Claims. (Cl. 55—55)

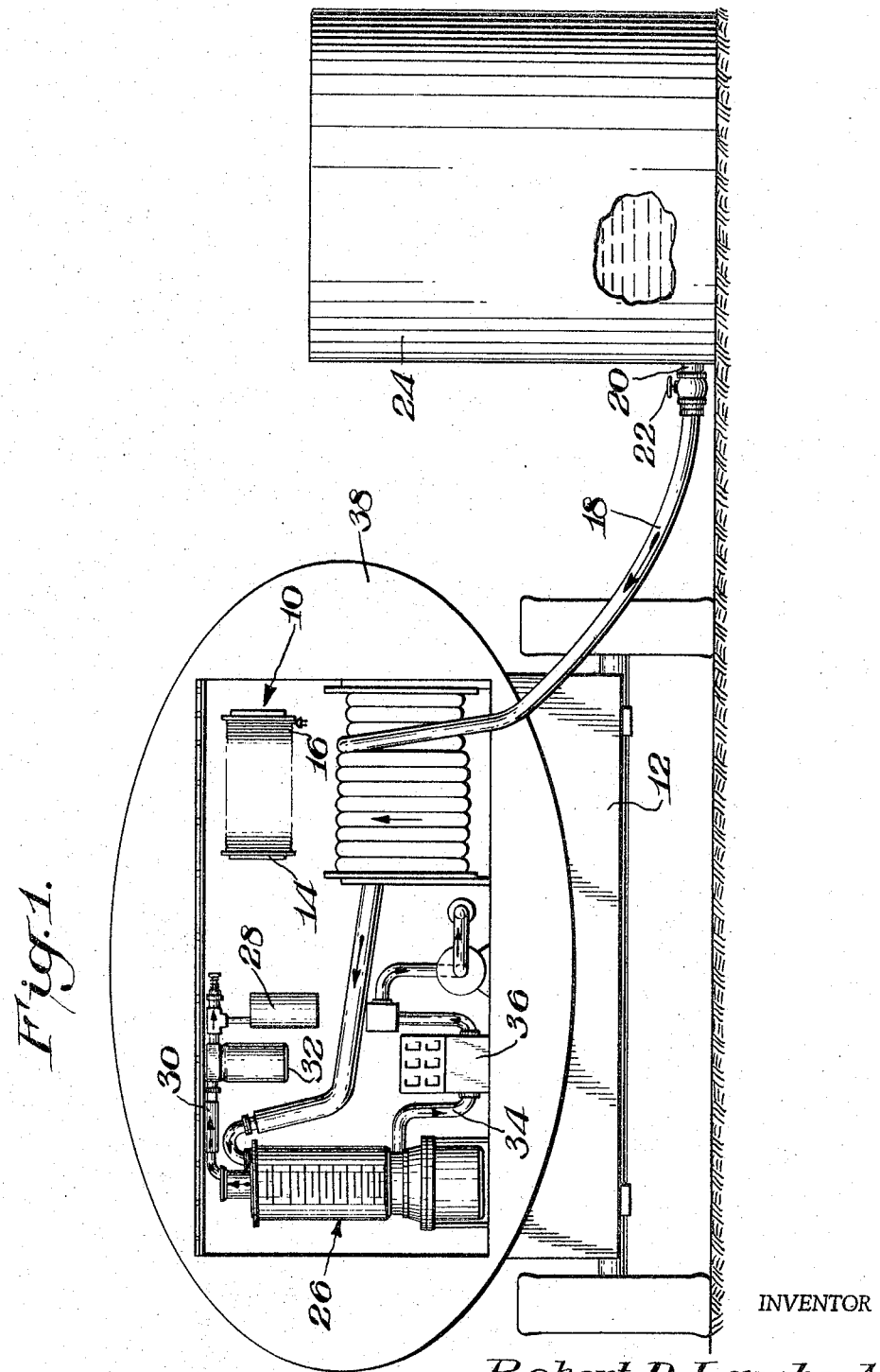

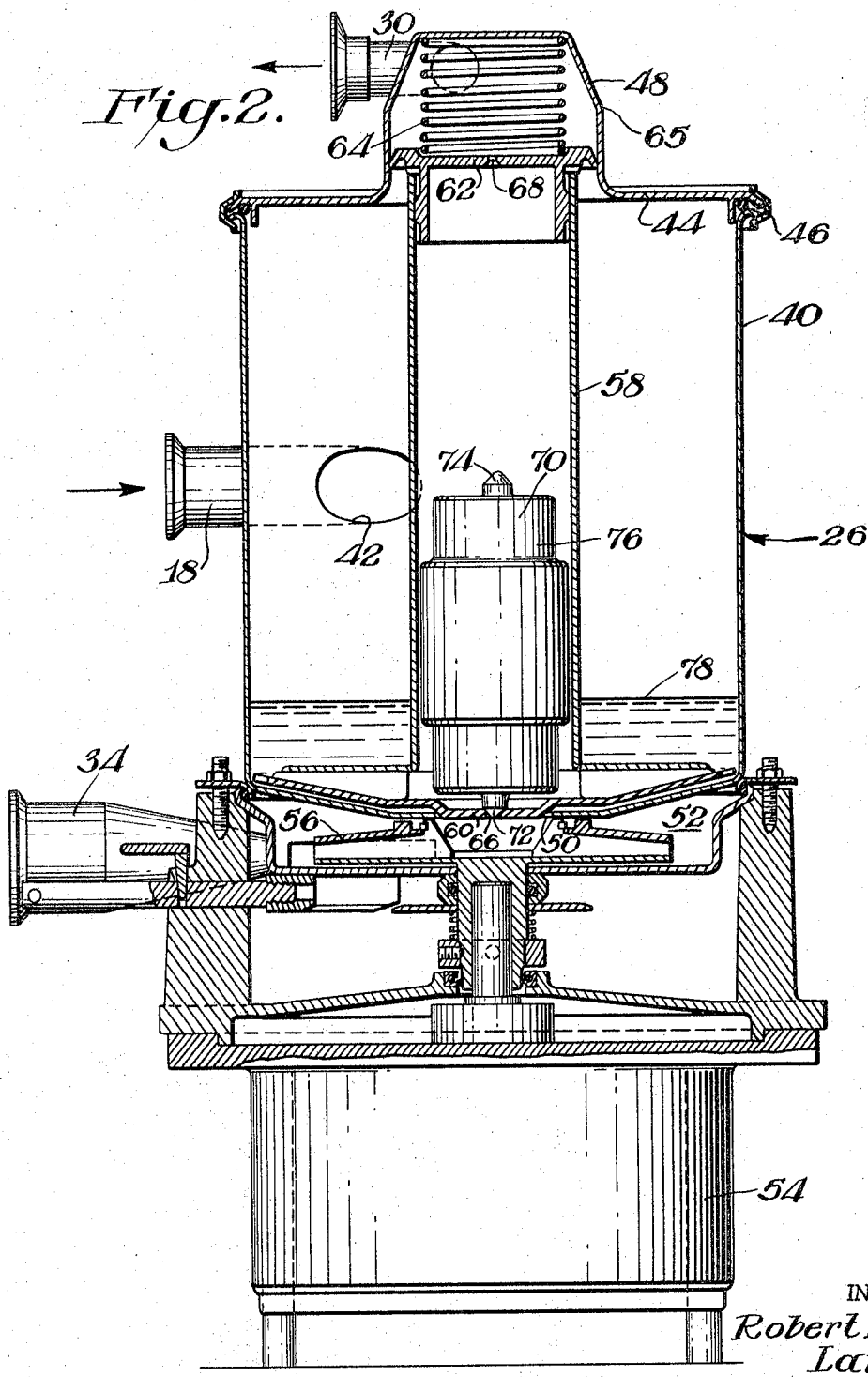

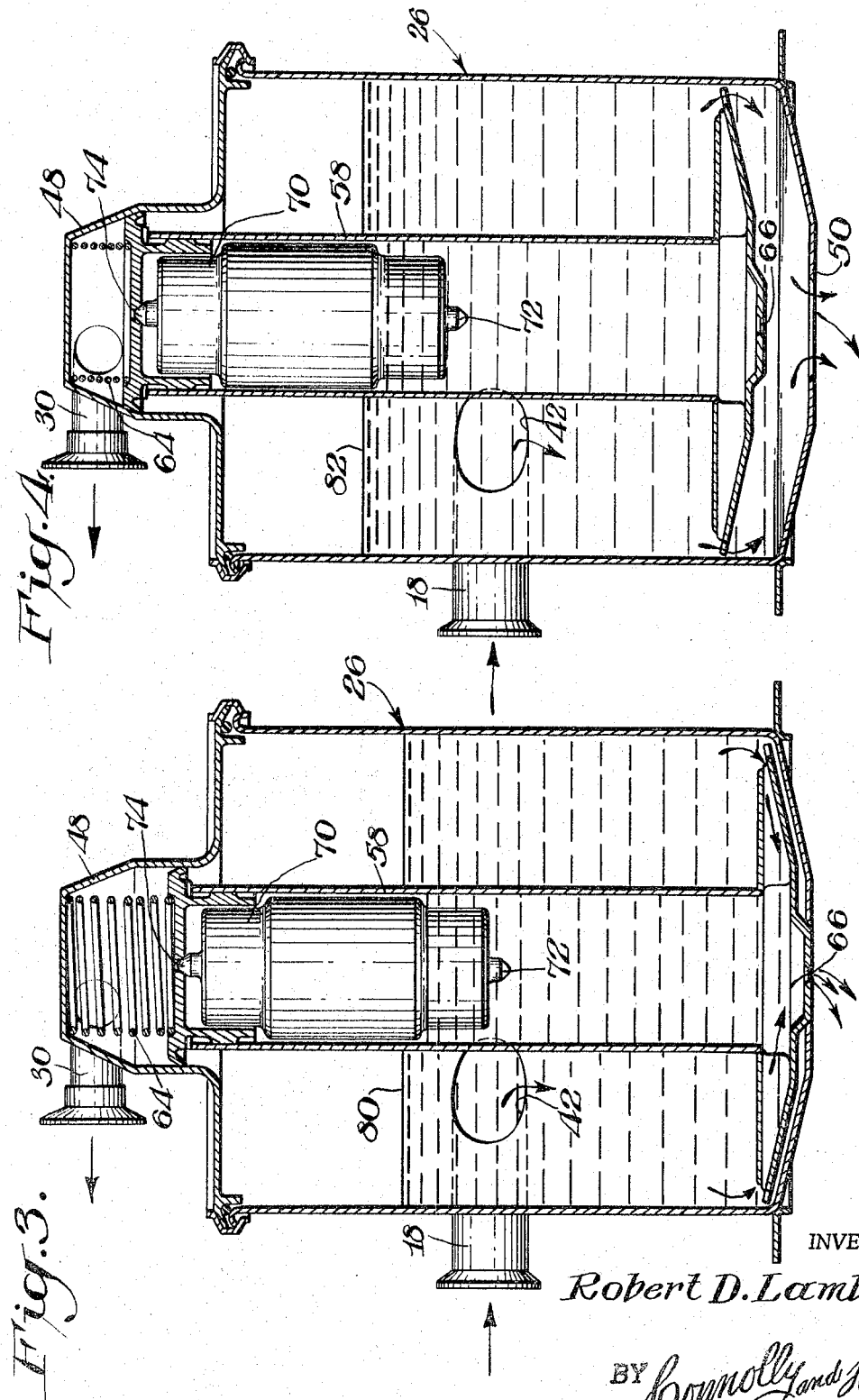

This invention relates to a method and apparatus for controlling flow of a liquid that is likely to contain entrapped air, and it more particularly relates to such a method and apparatus for controlling flow of milk.

Apparatus for metering a liquid that is likely to contain entrapped air usually has an air separator installed ahead of the meter to remove air from the liquid and controls its flow from the separator before it is measured. When the measuring system must be disconnected from the supply, such as in metering successive quantities of milk drawn by a vacuum from different farm tanks, it is difficult to terminate the metering operation with uniform amounts of liquid remaining in the system. Discrepancies in such amounts interfere with accuracy of measurement of each successive batches. Safeguards must also be provided to insure that air is not pumped through the meter. U.S. Letters Patent 3,036,738, patented May 29, 1962, describes a milk metering system which is actuated in accordance with liquid level in the separator to control its operation.

An object of this invention is to provide a method and apparatus for very accurately metering successive disconnected batches of liquid such as milk that is likely to contain entrapped air.

Another object is to provide such a method and apparatus that facilitates retention of uniform amounts of liquid in the system between batches and minimizes the tendency to pump air through the meter.

In accordance with this invention both the liquid level and vacuum in the separator are utilized to control the flow of liquid from the separator. Flow is initially induced into the separator by a vacuum pump until a predetermined minimum flow level of liquid is in the separator. The liquid pump then discharges the liquid at a minimal flow rate while entrapped air is exhausted through the vacuum line. The level of liquid in the separator increases and when a relatively high predetermined operating level is reached, the vacuum is utilized to actuate full discharge flow from the separator. When a sufficient amount of entrapped air accumulates in the top of the separator or when the supply of incoming liquid is exhausted the level of liquid drops below the operating zone and the full discharge flow is reduced back to the minimal rate. Minimal flow then continues until the level of liquid drops to the minimum flow level where it can be accurately shut off.

A particularly effective apparatus for providing these functions includes a vacuum-actuated piston valve for fully opening and closing the liquid discharge line and a minimal flow pilot-valve float. When the level in the separator raises the float off a port in the bottom of the separator, a minimal rate is allowed to flow from the separator. When the level raises the pilot valve float to the top of the separator, it switches the vacuum from the separator to the space above the piston to draw it upwardly and fully open the discharge line opening to the pump. This causes the full flow rate to be pumped through the meter. If the level of liquid drops below the operating zone, the pilot-valve float switches the vacuum away from the piston and back to the separator, which causes the piston to drop and close the large opening in the discharge line. The pump then operates at the minimal flow rate. When the liquid supply is exhausted, the pilot-valve drops to close the minimal flow port in the discharge line. The termination of flow at the minimal flow rate provides substantially the same low level at the end of each pumping operation. In a particularly effective form of this apparatus, the pilot float valve is unseated within the vacuum-actuated piston valve and contacts valve ports in its top and bottom.

Novel features and advantages of the present invention will become apparent to one skilled in the art from a reading of the following description in conjunction with the accompanying drawings wherein similar reference characters refer to similar parts and in which:

FIG. 1 is a front view in elevation of one embodiment of this invention;

FIG. 2 is a view in elevation partly in cross section of the separator used in the embodiment shown in FIG. 1 in one phase of operation; and FIGS. 3 and 4 are cross-sectional views in elevation of the separator shown in FIG. 2 in different phases of operation.

As shown in FIG. 1 metering assembly 10 is housed in insulated compartments in tank truck 12 and includes electric cable reel 14 carrying cable 16 for connection to a power source (not shown). At the beginning of each operation suction tube 18 is connected to farm tank outlet 20 and tank valve 22 is opened. As will later be described in detail, milk is drawn from tank 24, through tube 18, and into separator 26 where the entrapped air is separated from the milk. Vacuum pump 28 draws the entrapped air into vacuum line 30, through sediment container 32 and vents the air to the atmosphere. The milk is pumped by a centrifugal pump in the bottom of separator 26 into discharge line 34 and through meter 36 which registers the amount of flow through the system. From meter 36 the milk is pumped into tank 38 where it is temporarily stored.

As shown in FIGS. 2–4 separator 26 includes receptacle 40 which is for example, made of glass and calibrated (FIG. 1) so that the level of milk in receptacle 40 at the beginning of each operation can be compared with the level of milk at the end of each operation and any difference can be added or subtracted from the meter reading. Inlet 42 is formed at approximately the center of receptacle 40 for supplying milk to the receptacle from tube 18. The top of receptacle 40 is closed by cap 44 which is sealed to receptacle 40 by clamp 46. The central portion of cap 44 is indented away from receptacle 40 and forms a vacuum cylinder 48 connected to vacuum pump 28 by vacuum line 30. The bottom of receptacle 40 has a relatively large opening or outlet 50 leading to pump chamber 52 which, in turn communicates with discharge line 34. Motor 54 in the base of separator 26 drives centrifugal pump 56 which is advantageously located in pump chamber 52 at the bottom of receptacle 40 to eliminate the danger of air leakage into the pump suction.

Hollow perforated piston valve 58 is slidably mounted in receptacle 40. Base 60 of piston 58 opens and closes the major area of outlet 50, while head 62 slides in vacuum cylinder 48 and is urged downward by spring 64. Vacuum cylinder 48 tapers inwardly at approximately its center 65 to limit upward movement of head 62 as shown in FIG. 4. As a result head 62 is always maintained below vacuum line 30 and forms a sliding partition which prevents vacuum line 30 from communicating directly with receptacle 40. Base 60 of piston 58 has a minimal flow port 66, while vacuum port 68 is formed in head 62. Conveniently, hollow piston 58 also acts as a float guide for combined pilot and minimal flow valve 70. Conical or tapered tips 72 and 74 of pilot and minimal flow valve or float 70 seat in ports 66 and 68, respectively to control their opening and closing. Float 70 is recessed at its upper end 76 to provide sufficient clearance for float 70 when it slides within piston head 62 as shown in FIGS. 3–4.

In an advantageous form of this invention a vacuum switch is connected in the vacuum line at vacuum pump 28 to start pump 56 when float 70 rises, closing port 68 to increase the vacuum in cylinder 48 to, for example, 18 inches Hg; and for stopping pump 56 when float 70 drops, opening port 68, and lowering the vacuum in cylinder 48 below, for example, 18 inches Hg.

When motor 54 and vacuum pump 28 are started the milk is at minimum flow level 78 in receptacle 40 as shown in FIG. 1, as a result for example of the previous pick-up. Tip 72 of float 70 closes minimal flow port 66, while piston base 60 seats in outlet 50 to prevent flow of milk from receptacle 40. Milk is drawn into receptacle 40 by vacuum pump 28 acting through vacuum port 68 at, for example 20 g.p.m. As the level of milk increases, float 70 is raised and milk flows through port 66 at a minimal flow rate of, for example, 1 to 5 g.p.m. When the level of milk reaches level 80, or the lower limit of the main valve operating range, tip 74 of float 70 closes vacuum port 68 to disconnect the suction from separator receptacle 40. Between levels 78 and 80, when the milk is discharged at a minimal flow rate, the vacuum in receptacle 40 is for example 1 inch Hg plus suction lift. When tip 74 of float 70 seats in port 68 to close communication between vacuum cylinder 48 and receptacle 40, the vacuum in cylinder 48 rises to, for example, 18 inches to 25 inches Hg while the vacuum in receptacle 40 is for example only 9 inches to 11 inches Hg plus suction lift. This difference in vacuum is sufficient to overcome spring 64 and piston 58 is accordingly lifted to the position shown in FIG. 4. Pump 56 then discharges milk at a minimum flow rate of, for example, 75 g.p.m. through completely opened outlet 50. The level of milk increases to the upper limit 82 of the main valve operating range and milk is discharged at this maximum flow rate as long as the milk is between levels 80 and 82. Pump 56 also pulls milk into receptacle 40 at the same maximum flow rate. Reduced portion 65 of vacuum cylinder 48 prevents piston head 62 from moving past vacuum line 30 to maintain the vacuum differential between vacuum cylinder 48 and receptacle 40.

As milk enters receptacle 40 centrifugal force and gravity tend to separate the air in the milk and the air is expanded due to the vacuum. The air bubbles go toward the center of receptacle 40 and rise toward its top, while the milk flows downward toward the sides of receptacle 40. The air entering receptacle 40 with the milk lowers the milk level to also lower float 70 away from port 68. As air is bled from vacuum port 68 the level of milk rises and float 70 again closes port 68. If sufficient excess air, as from large slugs of air present at terminal flow from farm tank 24, accumulates in receptacle 40 to lower the level of milk below lower limit 80 of the main valve operating range, the vacuum in cylinder 48 drops below the minimum main valve operating valve of, for example, 18 inches to 25 inches Hg. When the vacuum in cylinder 48 drops below this valve spring 64 again urges piston 58 downward to close the major area of outlet 50. The milk is then discharged at the minimal flow rate through outlet 66. Vacuum pump 28, however, draws milk into receptacle 40 at a faster rate, such as 20 g.p.m., than the milk is discharged causing the level of milk in receptacle 40 to again rise. When lower main valve operating limit 80 is reached, outlet 50 is again completely opened, as previously described, and centrifugal pump 56 discharges the milk at the maximum flow rate.

When the supply of milk is exhausted, the level drops below lower operating level 80 and milk is discharged at a minimal flow rate as described above. The milk continues to be discharged at this minimal flow rate until the level drops to minimum flow level 78. Tip 72 then seats in base port 66 to completely stop the flow of milk through the separator when the milk is at the same level 78 in receptacle 40 as at the beginning of the operation.

What is claimed is:
1. A method of controlling flow of liquid from a liquid-gas separator having a vacuum pump connected to the upper portion of said separator for withdrawing gas through a vacuum line and a liquid pump connected to the bottom of said separator for discharging liquid through a discharge line, comprising the steps of drawing liquid into said separator with said vacuum pump, opening a relatively small area of the liquid discharge line and pumping liquid from said separator at a minimal flow rate when said liquid level in said separator is above a predetermined minimum flow level, causing said vacuum pump to open a relatively large area of said liquid discharge line when said liquid level in said separator is at a relatively high predetermined operating level, pumping liquid from said separator at a maximum flow rate when said liquid is at least as high as said operating level, closing said relatively large area of said liquid discharge line when said liquid level drops below said operating level, pumping said liquid at said minimal flow rate when said liquid is below said operating level but more than said minimum flow level, and closing said relatively small area of said liquid discharge line when said liquid drops to said minimum flow level.

2. An arrangement for controlling the flow of liquid from a liquid-gas separator comprising a receptacle, an inlet passage connected to said receptacle, a liquid discharge line connected to the bottom of said receptacle, liquid pump means in said liquid discharge line for withdrawing liquid from said receptacle, a relatively large area of flow and a relatively small area of flow in said discharge line, a vacuum line connected to the upper portion of said receptacle, suction means in said vacuum line for withdrawing gas from said receptacle, vacuum-actuated main valve means connected for opening and closing said relatively large area of said liquid discharge line whereby said pump means withdraws liquid at a high flow rate when said relatively large area is open, and combined pilot and minimal flow valve means connected for opening and closing communication between said vacuum line and said receptacle and for controlling the actuation of said main valve means, and connected for opening and closing said remaining relatively small area of said liquid discharge line whereby said pump means withdraws liquid at a minimal flow rate when said relatively large area is closed and said relatively small area is opened.

3. An arrangement as set forth in claim 2 wherein said combined pilot and minimal flow valve means is a float-operated valve, said float-operated valve being disposed and arranged for opening said relatively small area when the liquid in said receptacle is at a predetermined minimum flow level and for closing communication between said vacuum line and said receptacle when the liquid level in said receptacle is at a relatively high predetermined operating level, and the top of said main valve means communicating with said vacuum line whereby said main valve means is lifted away from said relatively large area when said float-operated valve closes communication between vacuum line and said receptacle.

4. An arrangement as set forth in claim 3 wherein a vacuum cylinder is mounted at the upper portion of said receptacle, said vacuum line being connected to said vacuum cylinder, and said main valve means being a piston slidable in said vacuum cylinder.

5. An arrangement as set forth in claim 4 wherein limit means are in said vacuum cylinder below said vacuum line to prevent said piston from moving past said vacuum line whereby said piston forms a sliding partition between said receptacle and said vacuum line.

6. An arrangement as set forth in claim 5 wherein the upper end of vacuum cylinder is of lesser diameter than said piston below said vacuum line to comprise said limit means.

7. An arrangement as set forth in claim 4 wherein said piston is hollow, said relatively small area being a minimal flow port in the base of said piston, a vacuum port being in the top of said piston, and said float-operated valve being disposed within said piston whereby said piston acts as a float guide.

8. An arrangement as set forth in claim 7 wherein said top of said hollow piston is of reduced internal diameter, the upper end of said float-operated valve being of lesser diameter than said reduced internal diameter of said top of said piston to provide sufficient clearance for said float-operated valve when it closes said vacuum port.

9. An arrangement as set forth in claim 7 wherein the tips of said float-operated valve are conical for seating in said vacuum port and in said minimal flow port.

10. An arrangement as set forth in claim 4 wherein resilient means reacts against said piston urging it toward said relatively large area.

11. An arrangement as set forth in claim 10 wherein said resilient means is mounted in said vacuum cylinder.

12. An arrangement as set forth in claim 2 wherein said pump means is disposed in a pump chamber in the bottom of said receptacle.

13. An arrangement as set forth in claim 2 wherein a portion of said receptacle is transparent, and indicia being on said transparent portion for indicating the level of liquid therein.

14. An arrangement for controlling the flow of liquid comprising a receptacle, an inlet passage connected to said receptacle, a liquid outlet in the bottom of said receptacle, a gas discharge passage in the upper portion of said receptacle, a piston valve slidable in said gas discharge passage and disposed over said liquid outlet for opening and closing said liquid outlet, a vacuum port connecting said gas discharge passage with said receptacle, a minimal flow port connecting said liquid outlet with said receptacle, and a combined pilot and minimal flow valve float in said receptacle disposed and arranged for opening and closing said ports.

15. An arrangement as set forth in claim 14 wherein said piston is hollow, said vacuum port being in the head of said piston, said minimal flow port being in the base of said piston, and said float being disposed within said piston whereby said piston acts as a float guide.

16. An arrangement as set forth in claim 14 wherein said gas discharge passage includes a vacuum cylinder secured to the top of said receptacle, and stop means being in said vacuum cylinder to limit the upward movement of said piston.

17. An arrangement as set forth in claim 16 wherein resilient means reacts against said piston urging it toward said liquid outlet.

References Cited by the Examiner

UNITED STATES PATENTS

| | | | |
|---|---|---|---|
| 2,367,692 | 1/1945 | Samiran | 55—170 |
| 2,428,045 | 9/1947 | Sharp et al. | 55—165 |
| 2,987,065 | 6/1961 | Bender | 137—205 |
| 3,036,738 | 5/1962 | Sonnberg | 222—66 |
| 3,211,171 | 10/1965 | Kinsey | 137—205 |

FOREIGN PATENTS 465,486 9/1928 Germany.

REUBEN FRIEDMAN, *Primary Examiner.*

C. N. HART, *Assistant Examiner.*